US005851348A

United States Patent [19]

Muenzer et al.

[11] Patent Number: 5,851,348

[45] Date of Patent: Dec. 22, 1998

[54] DISPENSER FOR TAGS, LABELS, INDEXING TABS AND THE LIKE

[75] Inventors: Kimberlee Cozby Muenzer, La Canada; Alan Dale Crawford, Burbank, both of Calif.

[73] Assignee: Barbara Thomas Enterprises, Inc., Seal Beach, Calif.

[21] Appl. No.: 848,550

[22] Filed: Apr. 28, 1997

[51] Int. Cl.[6] ...................... B32B 31/00

[52] U.S. Cl. ...................... 156/577; 156/574; 156/DIG. 48

[58] Field of Search ...................... 156/574, 577, 156/579, DIG. 48; 221/73

[56] References Cited

U.S. PATENT DOCUMENTS

| | | | |
|---|---|---|---|
| 1,408,499 | 3/1922 | Casterline . | |
| 2,107,603 | 2/1938 | Ellenburg . | |
| 2,560,241 | 7/1951 | Pangburn et al. | 156/577 |
| 2,694,533 | 11/1954 | Zucker . | |
| 2,708,076 | 5/1955 | Polster . | |
| 2,741,220 | 4/1956 | Belisle . | |
| 2,890,808 | 6/1959 | Seror | 156/577 |
| 3,222,242 | 12/1965 | Ingalls et al. | 156/584 |
| 3,487,977 | 1/1970 | Andersson | 221/73 |
| 3,686,055 | 8/1972 | Hermann | 156/384 |
| 3,955,711 | 5/1976 | Schroter et al. | 156/579 X |
| 4,576,311 | 3/1986 | Horton et al. | 156/584 X |
| 4,626,313 | 12/1986 | Karp | 156/362 |
| 4,718,971 | 1/1988 | Summers | 156/577 X |
| 4,880,490 | 11/1989 | MacIntyre | 156/577 X |
| 4,891,090 | 1/1990 | Lorincz et al. | 156/577 |
| 5,383,900 | 1/1995 | Krantz | 221/73 X |

*Primary Examiner*—Mark A. Osele
*Attorney, Agent, or Firm*—Fulwider Patton Lee & Utecht, LLP

[57] ABSTRACT

A dispenser for tags, and the like which are removably and adhesively secured along the length of a roll of liner paper for transfer from such liner paper onto a document. The dispenser includes a housing for the roll of liner paper containing a take-up reel upon which the liner paper is wound as the tags are forced out of the housing over a presser finger. The presser finger is utilized to apply the tag to the document.

9 Claims, 5 Drawing Sheets

FIG. 1
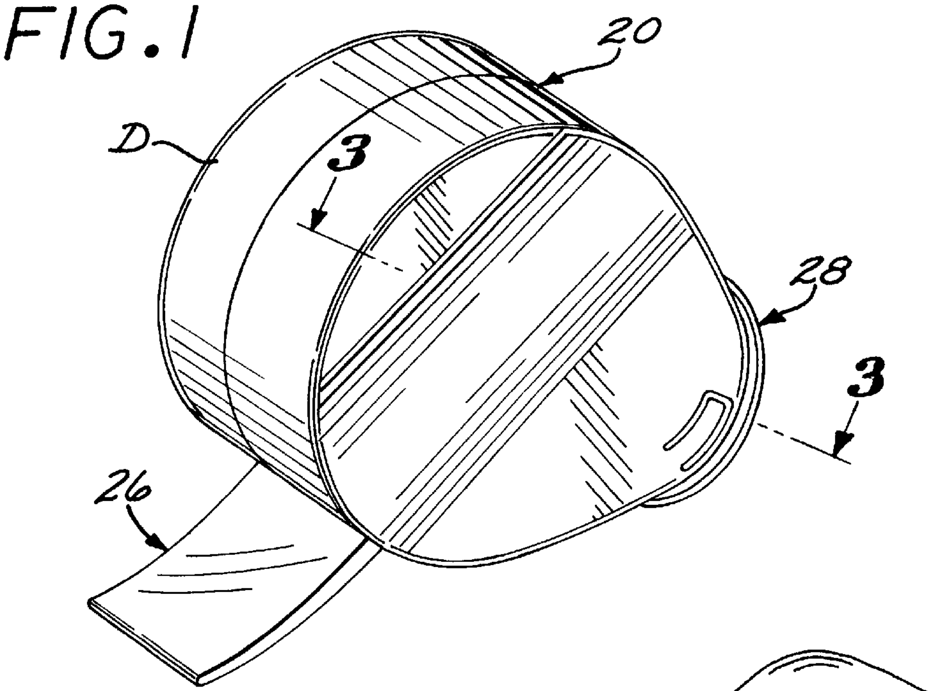
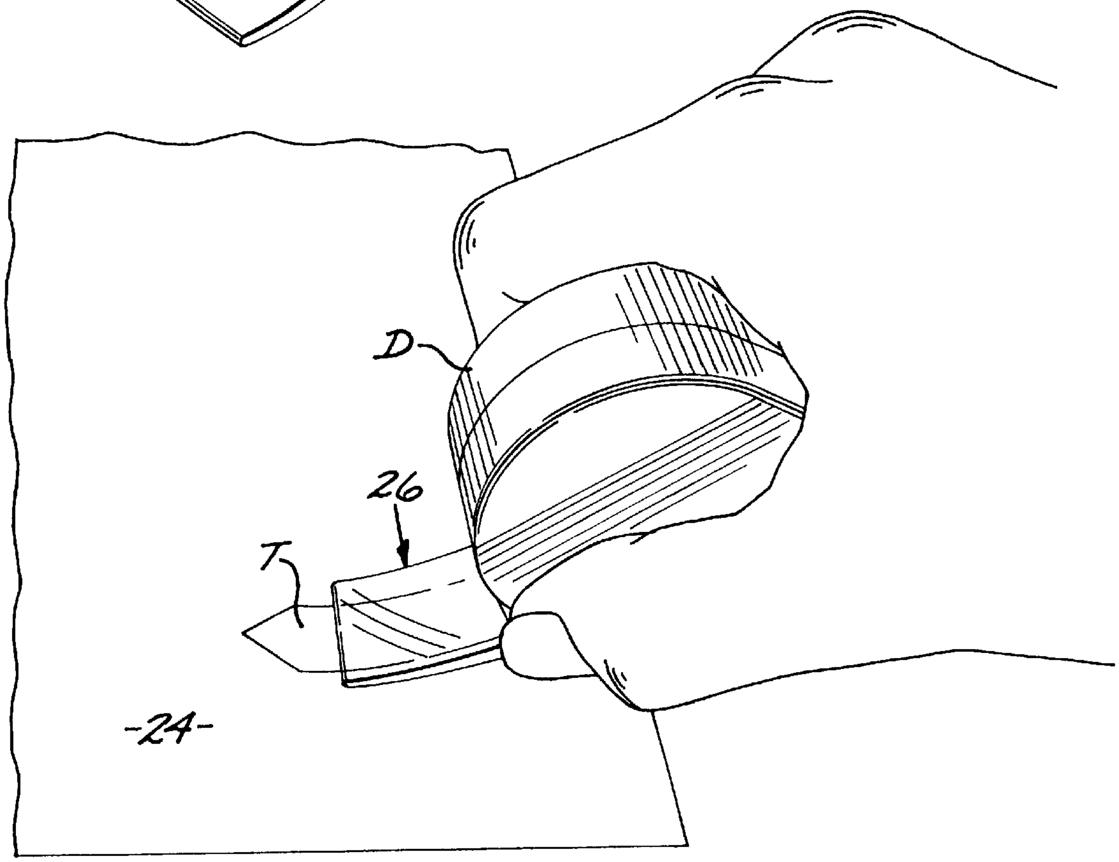
FIG. 2

FIG. 3
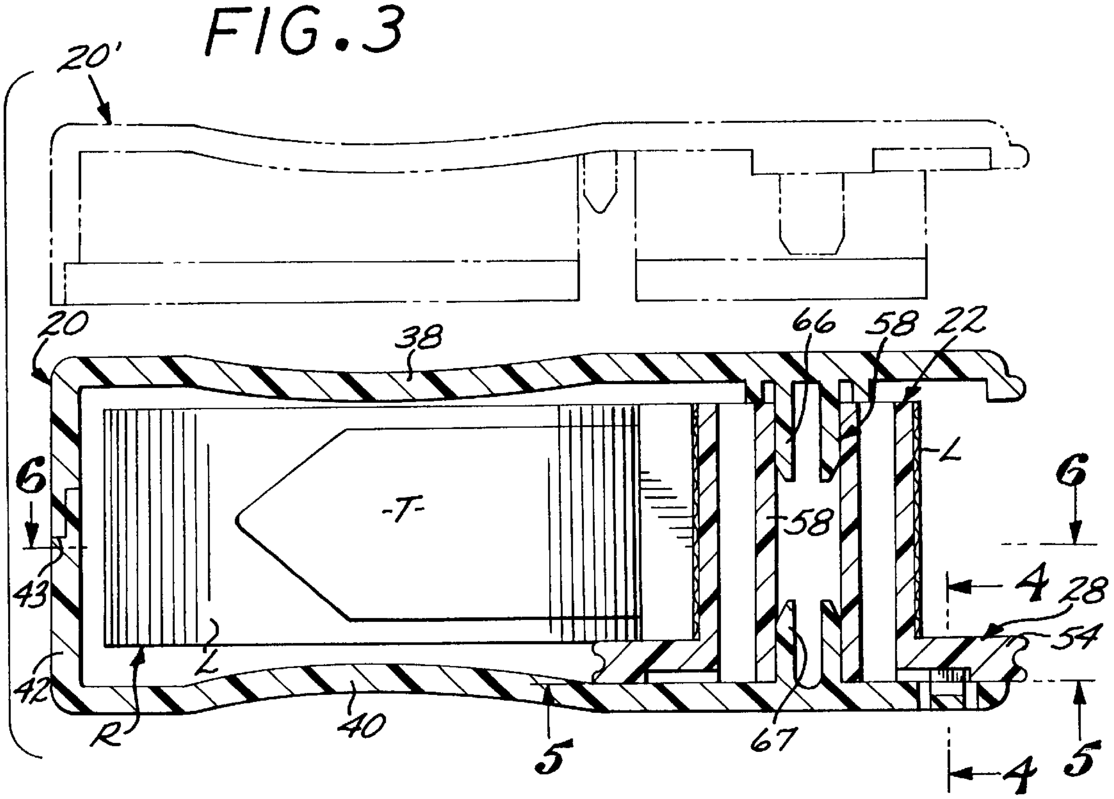
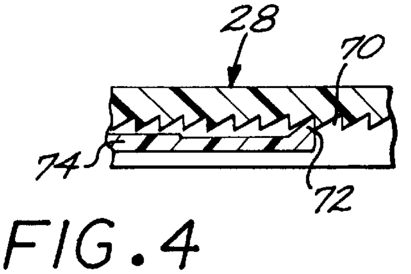
FIG. 4
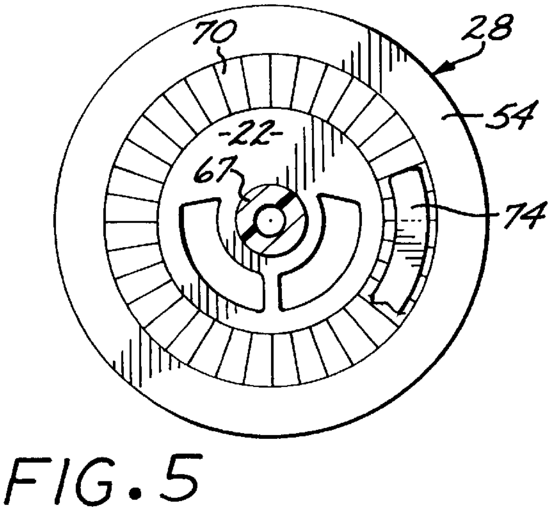
FIG. 5

DISPENSER FOR TAGS, LABELS, INDEXING TABS AND THE LIKE

BACKGROUND OF THE INVENTION

The present invention relates to dispensers for labels, tags, indexing tabs and the like which are removably and adhesively secured along the length of a roll of paper liner tape for transfer from such tape onto a document, file folder or other desired surface.

There are presently marketed dispensers adapted to effect such transfer. These dispensers utilize a closed housing which support the roll of liner paper with the free end of such tape extending through a tape discharge opening. A user manually grasps the free end of the liner paper to pull the tape out of the housing. As the liner paper is pulled out of the housing it passes a label discharge opening and a label is projected to be grasped by one hand of the user while the user's other hand grips the housing. The discharged label is then manipulated onto and adhered to a document, file folder or other surface. When the liner paper has been pulled out of the housing to such a length as to interfere with the operation of the dispenser, the exposed length must be manually torn off the roll.

A dispenser of the aforedescribed type is marketed by Barbara Thomas Enterprises, Inc. of Huntington Beach, Calif. and is shown in U.S. Pat. No. Des. 347,243 issued May 24, 1994.

SUMMARY OF THE INVENTION

The dispenser of the present invention is directed to a dispenser for labels, tags, indexing tabs and the like that eliminates the disadvantages of previously available dispensers of this type.

More specifically, the dispenser of the present invention permits a label or the like to be readily transferred from a roll of tape onto a desired surface using only one hand and in a minimum amount of time. The dispenser also directly adheres the label to the desired surface without requiring the user to touch the label. Additionally the subject dispenser automatically takes up the liner paper as the labels are transferred onto a document without requiring any attention from the dispenser user.

Other objects and advantages of the present invention will become apparent from the following detailed description, taken with the accompanying drawings.

DESCRIPTION OF THE DRAWINGS

FIG. 1 is a perspective view showing a preferred form of dispenser embodying the present invention.

FIG. 2 is a perspective view showing such dispenser being utilized to apply an adhesively-backed tag onto a document.

FIG. 3 is a sectional view taken in enlarged scale along line 3—3 of FIG. 1.

FIG. 4 is a sectional view taken along line 4—4 of FIG. 3.

FIG. 5 is a sectional view taken along line 5—5 of FIG. 3.

DETAILED DESCRIPTION OF A PREFERRED EMBODIMENT

Figure 6:
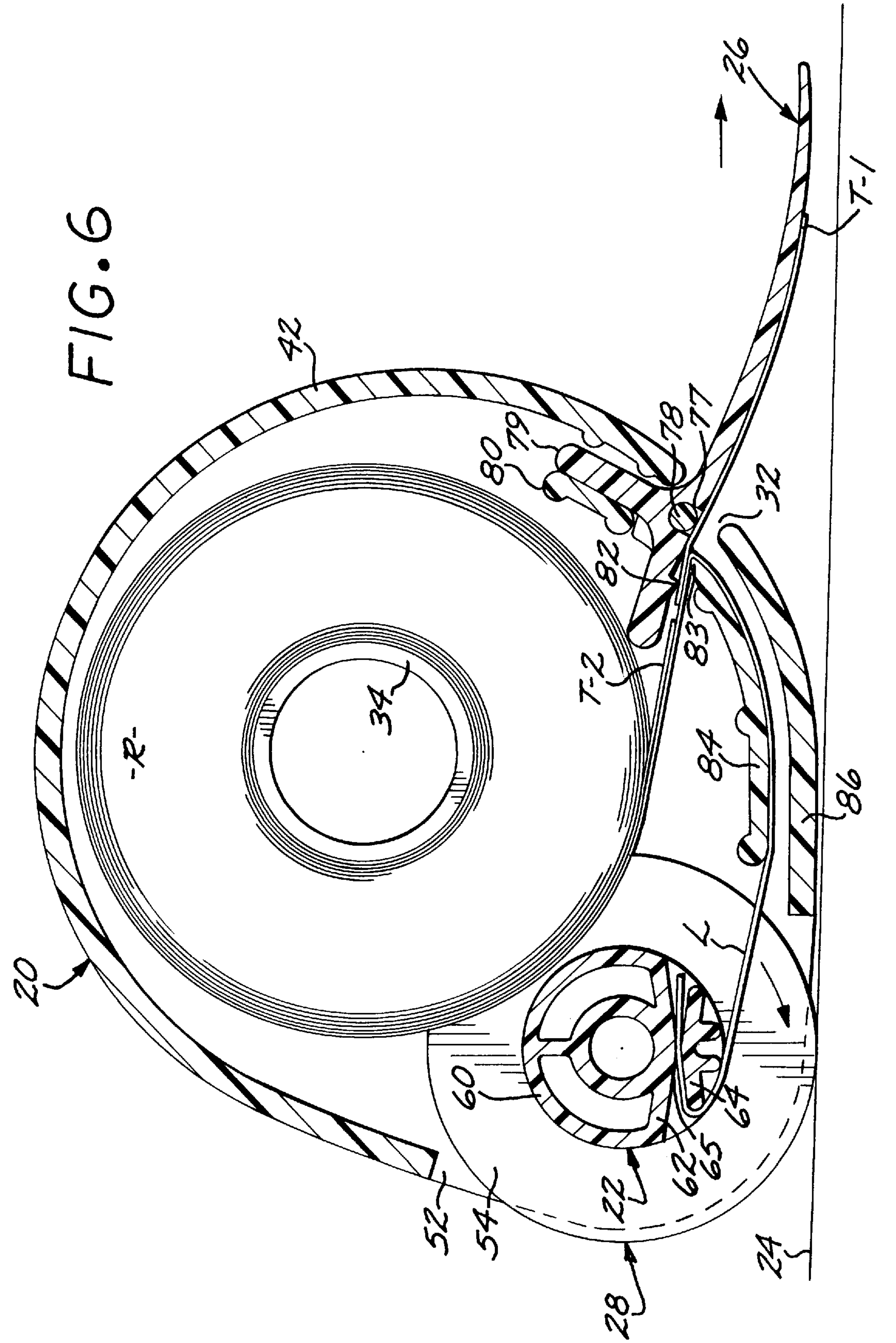
FIG. 6 is a vertical sectional view taken along line 6—6 of FIG. 3.

Referring to the drawings, there is shown a preferred form of dispenser D for a roll R of liner paper L having longitudinally spread adhesive-backed tags T thereon. Such roll R is sold by the aforementioned Barbara Thomas Enterprises, Inc. under the trademark "Redi-Tag". The dispenser D includes a housing 20, a take-up reel 22 for receiving the liner paper L as the tags T are consecutively removed from the liner paper and pressed onto a document 24 by an arcuate presser finger 26, and a drive roller 28 which is moved along the document 24 to simultaneously rotate the roll R and the take-up reel 22 to thereby transfer the liner paper L from roll R to the take-up reel 22 as the tags T are forced out of the discharge opening 32 of housing 20. Tags T may be utilized to designate a position on the document to receive a signature. It should be noted that the terms "tag", "label" and "tab" are used throughout the specification and claims interchangeably.

More particularly, roll R of liner paper and tags includes a spool 34 about which is spirally wrapped liner paper L, on the inner surface of which liner paper are removably adhered the adhesive-backed tags T. Roll R is removably disposed within housing 20 so as to be freely rotatable. Housing 20 includes sidewalls 38 and 40 which are bridged by a generally arcuate connector wall 42. As indicated in FIG. 3, connector wall 42 is removably jointed together at its mid-portion at 43 by friction fittings formed on the housing in a conventional manner to permit replacement of the roll R, as indicated in phantom outline at 20' in this figure.

Connector wall 42 is formed at its lower rear portion with the discharge opening 32 for tags T. A drive roller opening 52 is formed in the lower rear portion of the connector wall, as shown in FIG. 6. Drive roller 28 includes a wheel 54 integrally formed at one end of take-up reel 22, as indicated particularly in FIGS. 3–6. Take-up reel 22 includes an axle 58 integrally connected with an arcuate tape windup element 60 by webs 62. Take-up reel 22 also includes an integral retainer 64 extending horizontally from drive roller 28 and defining a slot 65 opposite webs 62 to removably receive the free end of liner paper L. Axle 58 is removably supported within housing 20 between a pair of like posts 66 and 67 integrally formed on the interior of housing sidewalls 38 and 40.

Figure 7:
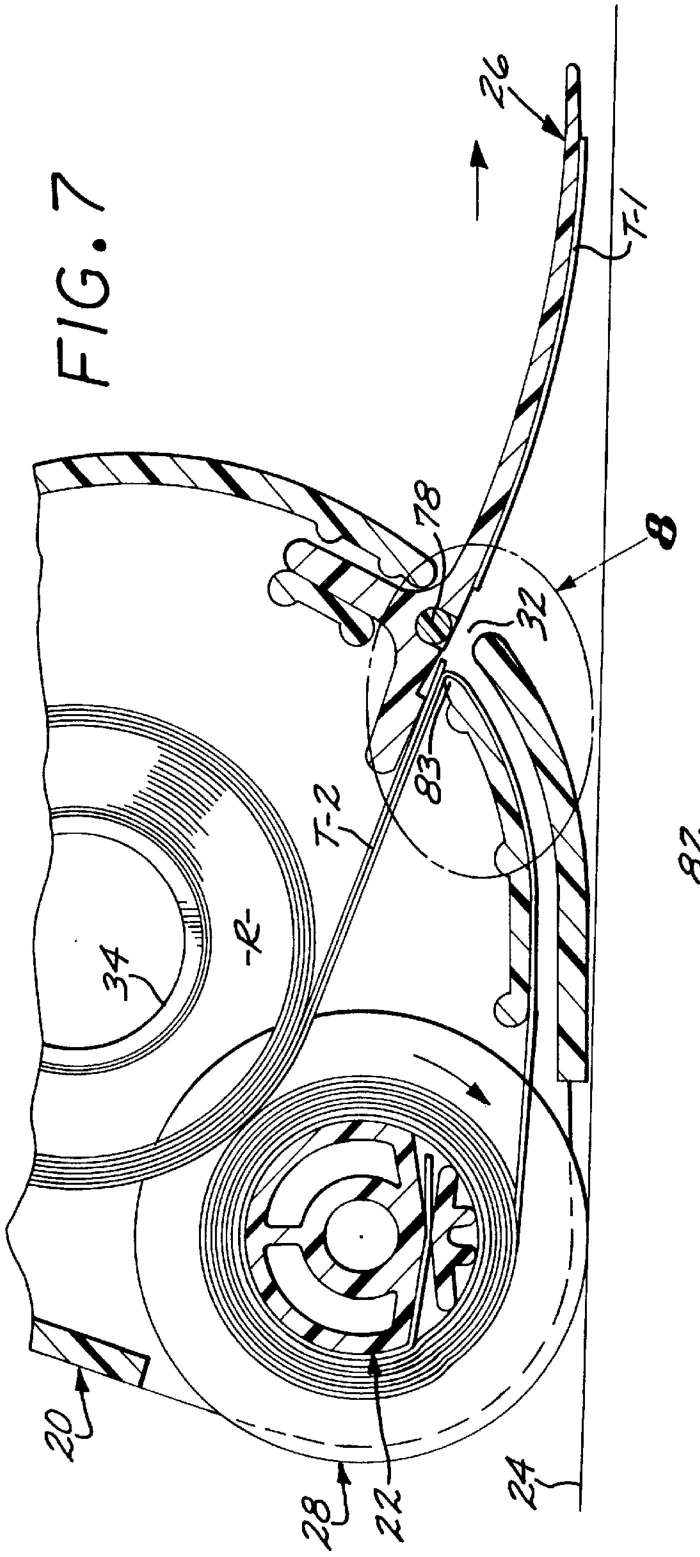
FIG. 7 is a broken sectional view similar to FIG. 6 showing the operation of said dispenser.

Referring to FIGS. 3, 4 and 5 there is provided a ratcheting mechanism to restrain rotation of drive roller 28 in the reverse direction opposite from the clockwise forward direction shown by directional arrows of FIG. 7. Such mechanism includes notches 70 formed on the exterior side of drive roller 28 that are slidably engaged by a pointed stop element 72 formed on the free end of flexible finger 74 integrally formed on the housing sidewall 40.

Figure 8:
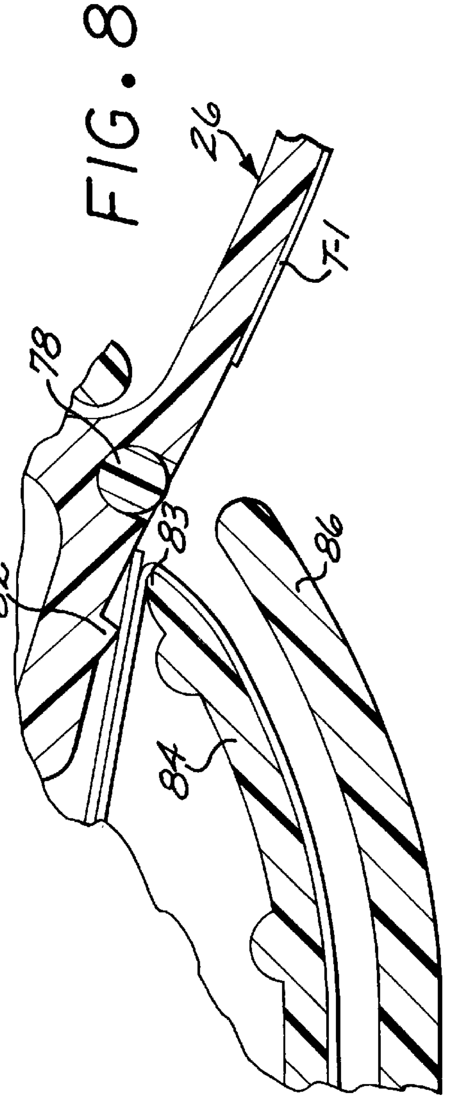
FIG. 8 is a broken enlarged view showing the discharge opening of said dispenser.

As shown in FIGS. 6–8, presser finger 26 is formed at its intermediate portion with a recess 77 that receives a pin 78 secured to the housing 20 whereby the presser finger is supported by the housing. The underside of the presser finger is disposed immediately above discharge opening 32, with the portion of the presser finger exterior of the housing being slightly concavely curved. An upstanding flange 79 is formed on presser finger 26 that fits between a strut 80 and the interior of the rear lower portion of connector wall. The end of presser finger 26 disposed within housing 20 is formed on its underside with a pointed abutment 82. The lower interior portion of housing 20 includes a concavely curved guide 84 spaced above the lower segment 86 of connector wall 42 to define a guide for liner paper L as the paper moves from roll R to take-up reel 22. The leading edge 83 of guide wall 84 performs a tag stripping function, and may have a radius of about 0.015". Preferably, presser finger 26 will be transparent and also flexible to facilitate transfer of tags T to document 24. All of the parts of the dispenser are preferably formed of synthetic plastic material.

Figure 9:
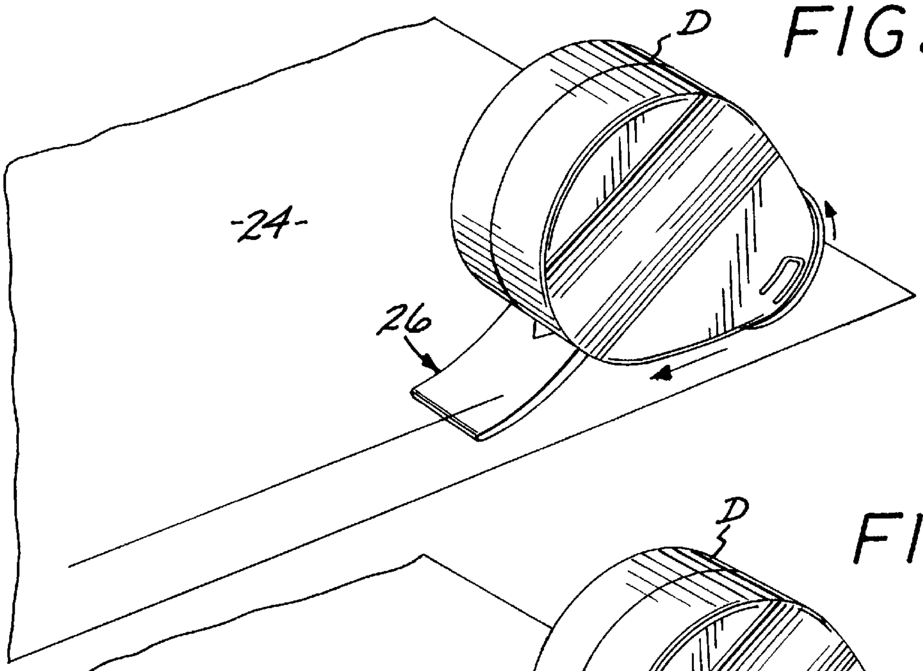
FIGS. 9, 10 and 11 are perspective views showing the operation of said dispenser.
Figure 10:
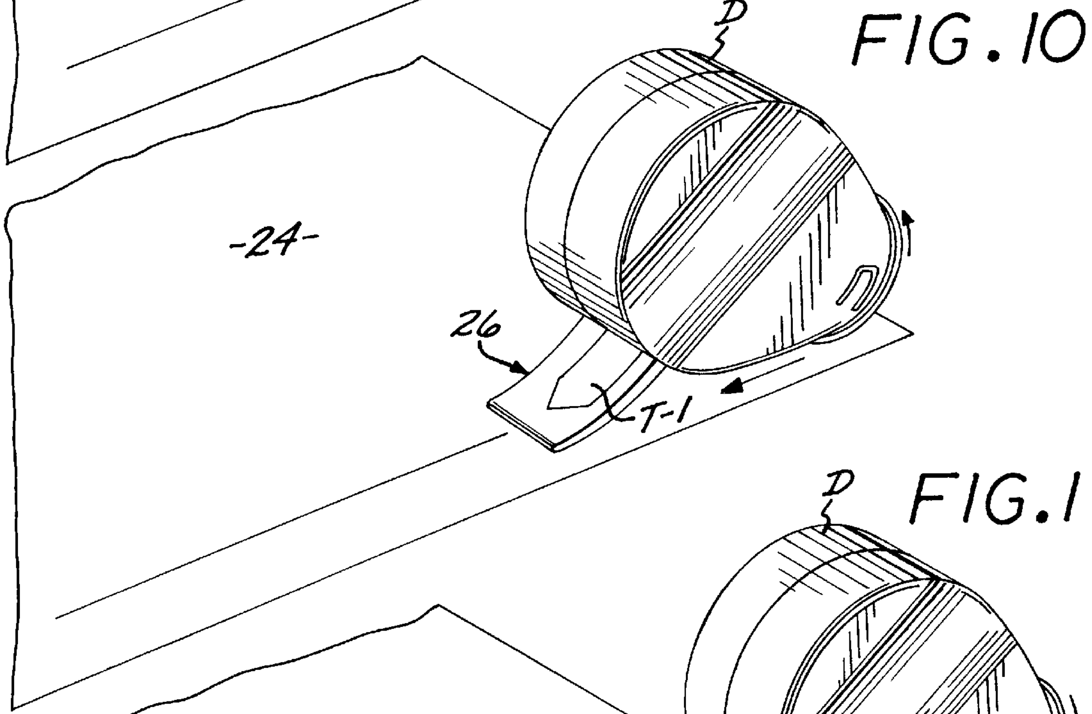

In the operation of the aforedescribed dispenser, housing 20 is pushed forward (from right to left in FIGS. 9–11) with drive roller 28 frictionally engaged with the desktop (or other firm surface, not shown) upon which document 24 is supported, and with the presser finger 26 lifted away from said surface. As shown particularly in FIGS. 6–8 the drive roller rotates the take-up reel 22 which in turn winds the liner paper onto itself, thereby pulling the liner paper (with tags attached) toward the discharge opening 32. The liner passes between the abutment 82 and the guide 84, and as the paper is pulled around the stripping edge 83 of guide 84 the tag T peels off the paper, since the flex force on the tag is greater than the adhesive force of the tag to the liner. The free end of tag T clings to the underside of presser finger 26 by static electric charge and is propelled forward by the continued motion of the liner until tag T-1 separates completely from the liner, as shown in FIG. 6. The tag T-1 continues to move forward along the underside of the presser finger 26 until the tag approaches the free end of the presser finger, as indicated in FIGS. 7 and 10.

Figure 11:
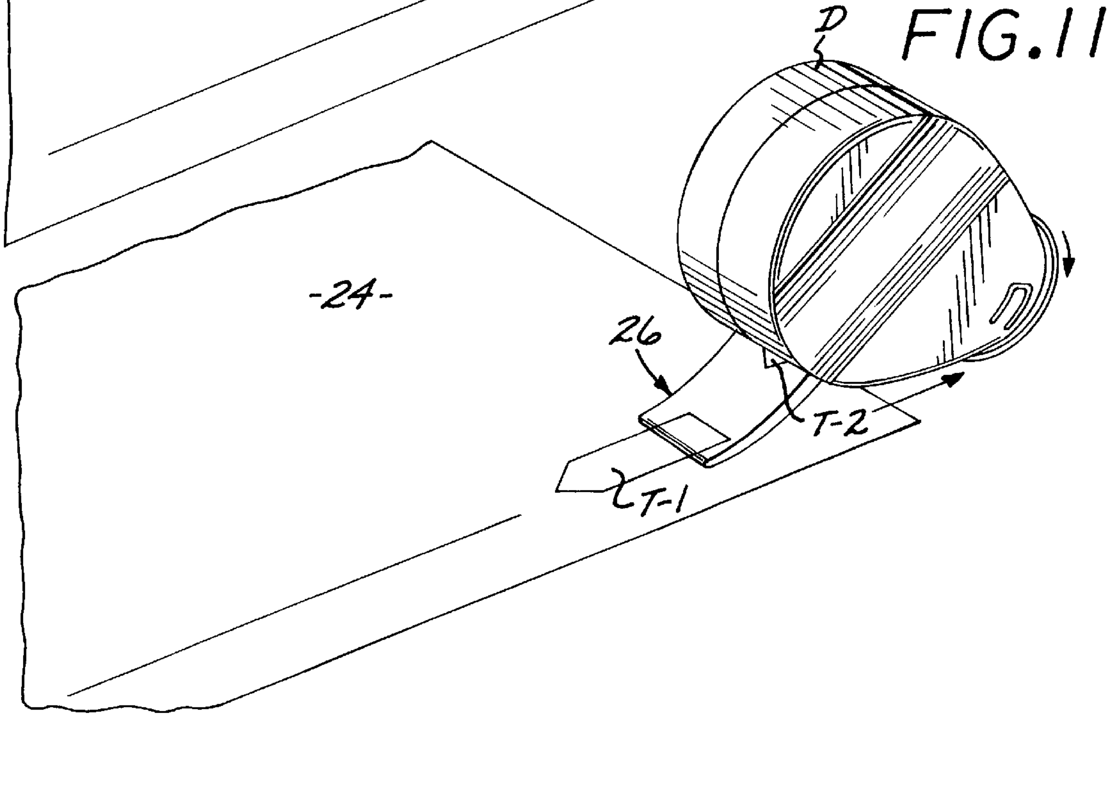

At this point the tag T-1 is ready for application to the document 24. The dispenser D is placed so that the tag T-1 is positioned where desired on the document. The tag clings to the presser finger 26 with the adhesive surface of the tag facing down so that when the presser finger presses against the document the tag adheres to the document. The user then pulls the dispenser back to the right as shown in FIG. 11 with the presser finger 26 pressed against the document 24 and the drive roller 28 above and not contacting the document so that the drive roller doesn't turn. In this manner the tag T-1 is burnished onto the document by the presser finger.

It will be apparent that the aforedescribed dispenser D of the present invention permits tags, labels, indexing tabs and the like to be accurately positioned upon a document, file folder or other described surface quickly and easily with just one hand. Moreover, the liner paper which initially carries the dispensed item is automatically collected within the dispenser without requiring the attention of the user. Such dispenser is economical of construction and can provide a long and trouble-free service life.

It will be understood by those skilled in the art that various modifications and changes may be made with respect to the foregoing detailed description without departing from the spirit of the present invention or the scope of the following claims.

What is claimed is:

1. A dispenser for adhesively-backed tags removably adhered to a roll of liner paper, said dispenser comprising:

a housing having a space for rotatably supporting said roll of liner paper, said housing also being formed with a tag discharge opening;

a drive roller rotatably supported by and partially extending from said housing;

a take-up reel rotatably supported by said housing and connected to said drive roller whereby rotation of the drive roller effects concurrent rotation of said take-up reel;

a presser finger on said housing above said tag discharge opening;

guide means in said housing to direct the liner paper from said roll onto said take-up reel as said drive roller is rotated;

stripper means on said guide means to peel the tags off the liner paper and onto the underside of the presser finger, said stripper means comprising one edge of the guide means; and a pointed abutment on the underside of the presser finger.

2. A dispenser as set forth in claim 1 wherein the take-up reel is coaxial with and rigidly attached to the drive wheel.

3. A dispenser as set forth in claim 2 wherein the presser finger is of arcuate configuration and is formed of a transparent material.

4. A dispenser as set forth in claim 2 wherein a ratcheting mechanism is interposed between the housing and the drive roller to restrain reverse movement of the drive roller.

5. A dispenser as set forth in claim 1 wherein the presser finger is of arcuate configuration and is formed of a transparent material.

6. A dispenser as set forth in claim 5 wherein a ratcheting mechanism is interposed between the housing and the drive roller to restrain reverse movement of the drive roller.

7. A dispenser as set forth in claim 1 wherein a ratcheting mechanism is interposed between the housing and the drive roller to restrain reverse movement of the drive roller.

8. A dispenser for adhesively-backed tags removably adhered to a roll of liner paper, said dispenser comprising:

a closed hand-held housing having sidewalls bridged by a connector wall;

friction fittings interposed between said walls to permit access to the interior of the housing for installing a roll of liner paper between the walls;

a drive roller opening formed in the connector wall;

a tag discharge opening formed in the connector wall;

a drive roller rotatably supported by and partially extending from said housing through said drive roller opening;

a take-up reel rotatably supported by said housing coaxial with and rigidly connected to said drive roller whereby rotation of the drive roller effects concurrent rotation of said take-up reel;

an integral arcuate presser finger formed of transparent material attached to said connector wall above said tag discharge opening;

guide means in said housing to direct the liner paper from said roll onto said take-up reel as said drive roller is rotated;

stripper means on said guide means to peel the tags off the liner paper and onto the underside of the presser finger;

a plurality of circumferentially spaced notches formed on the drive roller;

a flexible finger formed on the housing sidewall adjacent the drive roller notches; and a pointed stop element formed on the free end of said flexible finger that engages the drive roller notches to restrain rotation of the drive roller in the direction opposite that which effects concurrent rotation of the take-up reel.

9. A dispenser as set forth in claim 8 wherein the stripper means comprises one edge of the guide means and a pointed abutment on the underside of the presser finger.

* * * * *